United States Patent
Lin

(10) Patent No.: US 10,592,641 B2
(45) Date of Patent: Mar. 17, 2020

(54) ENCRYPTION METHOD FOR DIGITAL DATA MEMORY CARD AND ASSEMBLY FOR PERFORMING THE SAME

(71) Applicant: Hui Lin, Taipei (TW)

(72) Inventor: Hui Lin, Taipei (TW)

(*) Notice: Subject to any disclaimer, the term of this patent is extended or adjusted under 35 U.S.C. 154(b) by 0 days.

(21) Appl. No.: 16/044,507

(22) Filed: Jul. 24, 2018

(65) Prior Publication Data

US 2018/0357393 A1 Dec. 13, 2018

Related U.S. Application Data

(63) Continuation of application No. 14/742,197, filed on Jun. 17, 2015, now abandoned.

(51) Int. Cl.
| | | |
|---|---|---|
| *G06F 21/10* | (2013.01) |
| *G06F 12/14* | (2006.01) |
| *G06F 21/79* | (2013.01) |
| *G06F 21/44* | (2013.01) |
| *G06F 21/60* | (2013.01) |
| *H04L 9/00* | (2006.01) |

(52) U.S. Cl.
CPC .......... *G06F 21/10* (2013.01); *G06F 12/1416* (2013.01); *G06F 21/44* (2013.01); *G06F 21/606* (2013.01); *G06F 21/79* (2013.01); *H04L 9/006* (2013.01); *G06F 2221/0704* (2013.01)

(58) Field of Classification Search
CPC ....................................................... G06F 21/10
See application file for complete search history.

(56) References Cited

U.S. PATENT DOCUMENTS

| | | | | |
|---|---|---|---|---|
| 5,721,781 A | * | 2/1998 | Deo | G06Q 20/341 705/67 |
| 5,940,854 A | * | 8/1999 | Green, Jr. | G11B 7/00736 711/112 |
| 6,076,161 A | * | 6/2000 | Ho | G06F 9/321 712/E9.035 |
| 6,513,121 B1 | * | 1/2003 | Serkowski | G06F 21/10 209/203 |
| 2006/0047604 A1 | * | 3/2006 | Kraft-Oz | G06F 9/44573 705/59 |

* cited by examiner

*Primary Examiner* — Andrew C Georgandellis

(57) ABSTRACT

Embodiments of a portable data storage device and a method of protecting data stored in the portable data storage device are provided. In one embodiment, the portable data storage device includes a device identification unique to the portable data storage device, a rights object containing information indicative of access rights and a verification identification, a memory to store the device identification and the verification identification, and controller logic. The memory is partitioned into a plurality of areas of memory, including: a first area as a protection area to store an instruction code, a second area as a partition table area to store a partition table, and a third area as a file area to store data files. In response to a request from a client external to the portable data storage device, the controller logic compares the verification identification with the device identification to allow the client to access of the data files if the verification identification matches the device identification.

1 Claim, 3 Drawing Sheets

ENCRYPTION METHOD FOR DIGITAL DATA MEMORY CARD AND ASSEMBLY FOR PERFORMING THE SAME

The invention is a continuation patent application (CPA) of the U.S. patent application Ser. No. 14/742,197 filed at Jun. 17, 2015, invented and assigned to the inventor of the present invention, and thus the contents of the U.S. patent application Ser. No. 14/742,197 is incorporated into the present invention as a part of the specification.

TECHNICAL FIELD

The present disclosure is generally related to digital data protection and, more particularly, to protection of digital data on a portable data storage device.

BACKGROUND

Since the improvement of the computer and digital technologies, many created contents (such as movies or music, etc.) may be converted into digital forms of audio and/or video compression files. Subsequently, the files may be burned, or recorded, to portable data storage media such as CDs or DVDs, or other audio/video (A/V) carriers for playing back. Other than movies and music, the contents may include speech contents, teaching contents, opera contents, etc. All these contents may be converted into digital A/V compression files (hereinafter referred to as digital data).

However, due to the progress of compression and duplication technologies, all contents can be easily converted into file formats which can be easily copied by various duplication or burning technologies. With the prevalence of networks, digital contents can be widely distributed by being uploaded to networks and downloaded from networks. As the intellectual assets of creators of such contents cannot be well protected due to new duplication technologies, the will for creativity may be suppressed. Therefore, there is an eager demand for a novel technology to prevent the digital contents from being copied when copying is not permitted, so as to protect the intellectual assets of musicians, publishers, actors, and the like, and to match the requirement of intellectual property laws.

In generally, currently most portable data storage media for carrying digital data are in the forms of discs such as CDs and DVDs. Other than some less commonly used erasable optical discs which can be burnt many times, most carriers cannot be burnt repeatedly. Since these portable data storage media have large volumes, in many currently available players (such as MP3), the digital data are copied to memory cards (for example, SD cards) for use.

Current memory cards are mainly used to store the digital data and thus have the same use as discs. If a memory card can be used as a digital data carriers having the security features of secured digital (SD) card and small form factor, then it makes a preferable digital data carrier and can be carried easily and widely used with security function for the protection of the data stored therein. Other than high transmission speed and large capacity, the SD memory cards currently available are relatively inexpensive to be accepted by the market. Thus, the time of memory cards as the choice for digital data carriers has come.

Typically, digital rights management (DRM) in a personal computer (PC), for example, can provide security in data transfer for downloading digital data through a network as the user pays a fee for downloading the digital data without fear of the downloaded data being copied or spread illegally. DRM can also be used to confine the times, identifies, time periods and the number of copies for duplication of the download contents. Nevertheless, current DRM techniques cannot provide data security for the data stored on portable data storage media (especially in the case of memory cards).

SUMMARY

Accordingly, an objective of the present disclosure is to provide a system and method of encryption of digital data on a portable data storage device, including a digital rights management technique in a portable data storage device where digital data are stored. In one aspect, an identification code is compared with a rights object for accessing and downloading digital data in a portable data storage device, such as a memory card.

To achieve the above object, an inventive portable data storage device is described herewith. In one aspect, a memory is installed in a portable data storage device in the form of a memory card. The memory is partitioned and has a controller area that contains a controller corresponding to a memory card reader. The memory also includes a protection area, a partition table area, and a file area. A portable storage identification (PSID) unique to the portable data storage device is stored in one of the four areas by using an application programming interface (API). When the file area in the memory card stores a rights object and if a memory card reader is to read data stored in the memory card, the PSID is used as an encryption mechanism so as to enhance the digital rights management of the digital data stored in the memory card.

Therefore, the memory card has four areas, including the controller area, the protection area, the partition table area, and the file area. The PSID may be recorded in the memory card by one of the following ways.

1. If the PSID is to be recorded in the controller area of the memory of the memory card, a memory card reader (such as an SD reader, for example) with an API developed for interacting with the controller may be used for reading data from or writing data to the memory of the memory card. This is a safety way.

2. If the PSID is to be recorded in the protection area of the memory of the memory card, a special tool may be used for partitioning the protection area of the memory of the memory card. A general SD reader and an API developed for interacting with the protection area may be used for reading data from and writing data to the memory of the memory card.

3. If the PSID is to be recorded in the partition table area of the memory of the memory card, the Windows™ operating system of Microsoft Corporation or other operating system may be used to format the partition table area for recording the PSID in the partition table area.

4. If the PSID is to be recorded in the file area of the memory of the memory card, the Windows™ operating system of Microsoft Corporation or other operating system may be used to format the file area for recording the PSID in the file area.

Various embodiments and advantages will be more readily understood from the following detailed description when read in conjunction with the appended drawings.

DETAILED DESCRIPTION

In order that those skilled in the art can further understand the present disclosure, a detailed description is provided herewith. However, the description and the appended drawings are not to be used to confine the scope and spirit of the present disclosure defined in the appended claims.

Figure 1:
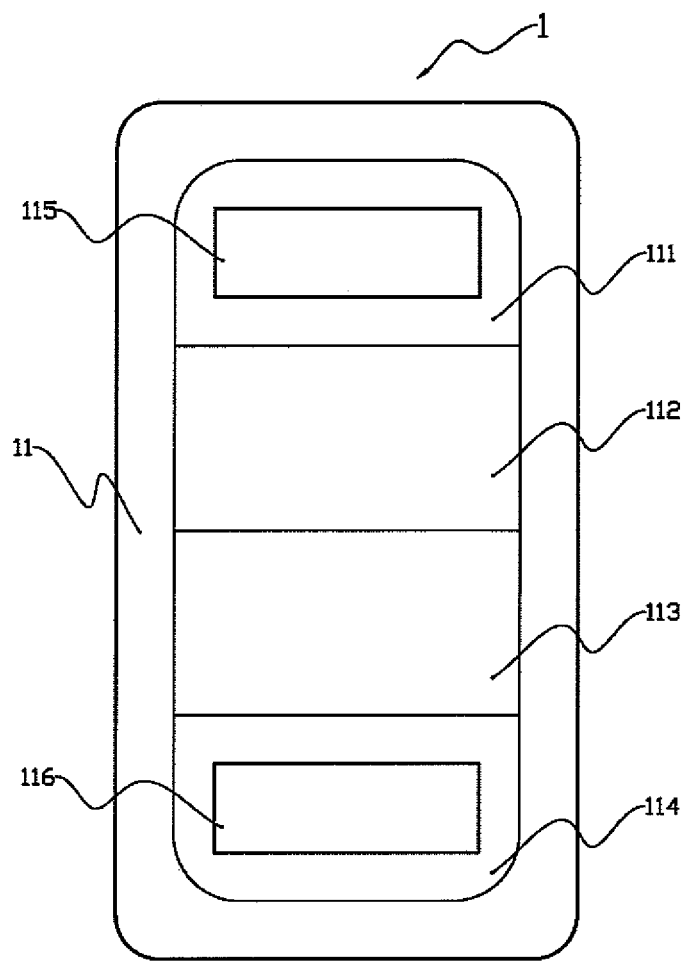
FIG. 1 illustrates a structural diagram of a portable data storage device in accordance with a non-limiting embodiment.

FIG. 1 shows a portable data storage device with encryption capability, in the form of a memory card 1 and contains a memory 11 therein. The memory 11 is partitioned into a number of areas including a controller area 111 having therein a controller logic, such as firmware for example, that corresponds to a data retrieval device such as a memory card reader, a protection area 112 to store an instruction code, a partition table area 113 to store a partition table, and a file area 114 to store files of digital data. In one embodiment, an application programming interface (API) 118 is utilized to store a portable storage identification (PSID) 115 unique to the memory card 1 to one of these areas. (FIG. 1 shows the PSID 115 as being stored in the controller area 111 as an example for illustrative purpose only.) In one embodiment, when the file area 114 of the memory card 1 stores a rights object 116 that contains information indicative of access rights of a user of the memory card 1, the PSID 115 is used to identify a verification ID stored in the rights object 116 as an encryption mechanism to enhance the digital rights management of the memory card 1.

Figure 2:
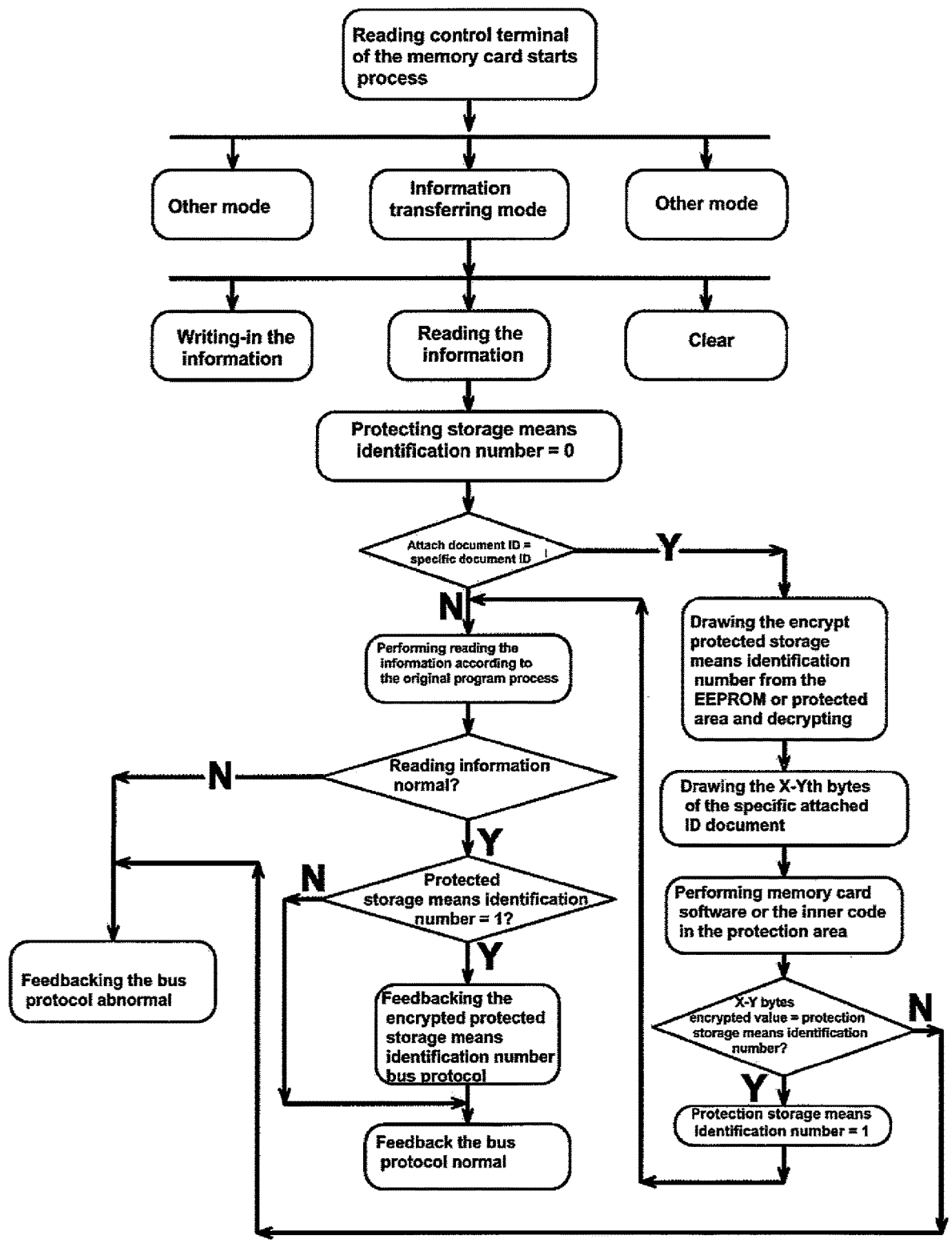
FIG. 2 illustrates a flow diagram in accordance with a non-limiting embodiment.

With referring to FIG. 2, a manufacturer of the controller in the controller area 111 of the memory card 1 must keep the API 118 strictly confidential, or an unauthorized party could otherwise obtain the PSID 115 stored in the memory card 1, for example, even when the PSID 115 is stored in the protection area 112.

In one embodiment, to further ensure the security of the PSID 115 in the memory card 1, the memory card 1 is formed as a personal storage disc. Additionally, a universal serial bus (USB) adaptor may be integrated with the memory card 1 so that the user can transfer data through the USB interface of a computing device. This makes it impossible for an unauthorized party to access or decode the data stored in the memory 11 by detaching the memory card 1.

The memory may be a flash memory in one embodiment, or an electrically-erasable programmable read-only memory (EEPROM) in an alternative embodiment. The PSID 115 may be stored in one of the four areas of the memory card 1, as described below.

Figure 3:
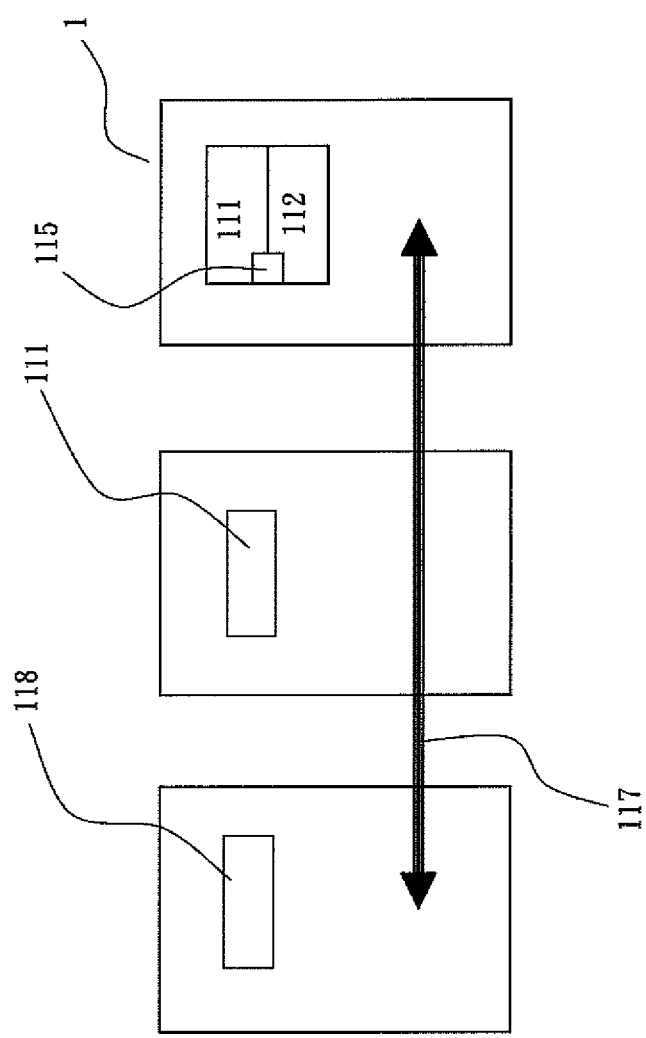
FIG. 3 illustrates a schematic diagram of data encryption and decryption in accordance with a non-limiting embodiment.

1. In one embodiment, the PSID 115 is stored in the controller area 111 of the memory 11 of the memory card 1. A typical memory card reader (such as an SD reader, for example) with an API developed for interacting with the controller in the controller area 111 of the memory of the memory card may be used for reading data from and writing data to the memory 11. This is a safe way for data protection. Referring to FIG. 3, a public key infrastructure (PKI) 117 is used as an encryption and decryption mechanism between the controller in the controller area 111 and the API 118. In one embodiment, the PKI 117 is used as the encryption and decryption mechanism between an encryption system server and a decryption program. The PKI 117 is currently the most efficient encryption and decryption mechanism known in the art.

2. In another embodiment, the PSID 115 is stored in the protection area 112 of the memory 11 of the memory card 1. A special tool may be used for partitioning the protection area 112 of the memory card 1. A typical SD reader and an API developed for interacting with the protection area 112 of the memory of the memory card 1 may be used for reading data from and writing data to the memory 11.

3. In still another embodiment, the PSID 115 is stored in the partition table area 113 of the memory 11 of the memory card 1. The Windows™ operating system of Microsoft Corporation or other operating system may be used to format the partition table area for recording the PSID 115 in the partition table area 113.

4. In yet another embodiment, the PSID 115 is stored in the file area 114 of the memory 11 of the memory card 1. The Windows™ operating system of Microsoft Corporation or other operating system may be used to format the partition table area for recording the PSID 115 in the file area 114.

In one embodiment, regardless of which area of the memory 11 the PSID 115 is stored in, the rights object 116 contains a verification ID and a file having information indicative of the access rights granted to a user in order for the user to access digital data stored in the memory card 1. When a data retrieval device, such as a PC, a handset, or any other A/V playing device attempts to access the rights object 116, the controller in the controller area 111 decrypts the file in the rights object 116. In one embodiment, the control does so by using controller logic in the controller area 111 or a program in the protection area 112 to obtain the verification ID stored in the decrypted file of the rights object 116 to compare with the PSID 115 stored in the protection area 112 (or another one of the four areas). If the verification ID stored in the rights object 116 and the PSID 115 stored in the memory 11 are matched, the file of the rights object 116 is provided to the data retrieval device. If there is no match, the playing device is informed that the reading operation is not permissible.

In one embodiment, only one PSID 115 is stored in the controller area 111 or the protection area 112, no matter what technique (such as a read-only unique device serial number of the memory 11 or a random number generator with a one-time programming) is used to generate the PSID 115, the PSID 115 cannot be duplicated. The controller in the controller area 111 or the decrypting API 118 of a playing device will compare the verification ID stored in the rights object 116 with the PSID 115. When the verification ID stored in the rights object 116 is matched to the PSID 115, the decryption and playing operations can be performed.

In one embodiment, the data transferred between the controller in the controller area 111 of the memory card 1 and the decrypting API 118 of a playing device are encrypted. With the controller of the memory card 1 and the corresponding decrypting API 118 to encrypt the transferred data referring to FIG. 3) the data cannot be decrypted even if intercepted by a memory card reader, such as an SD card reader, of an unauthorized party.

FIG. 2 will be further described herein. In one embodiment, when the controller in the controller area 111 accepts instructions from a data retrieval device for reading data, it will identify the name of a sub-file, such as a portion or a component of the memory 11 (read-only memory, or ROM, for example). When it is confirmed that the sub-file name is a specific file name formed from one or more variables stored in the protection area 112, the PSID 115 encrypted and stored in the protection area 112 (may be an EEPROM or flash memory, for example) is decrypted. One or more bits of data of the sub-file name is compared with the PSID 115 according to the controller logic in the controller area 111 or an instruction code stored in the protection area 112. If the bit or bits of data from the sub-file name matches the PSID 115, the data retrieval device can read data in the memory card. If there is no match, however, an abnormal signal is sent out according to a bus protocol.

The present disclosure provides a digital data protection mechanism. Other than music and image, even video and other digital data, can be protected effectively to assure only the authorized digital data can be used. An illegal invader cannot access the data.

The present disclosure is thus described. Many variations thereof are not to be regarded as a departure from the spirit and scope of the present disclosure, and all such modifications as would be obvious to one skilled in the art are intended to be included within the scope of the following claims.

What is claimed is:

1. A portable data storage device comprising:
   a device identification unique to the portable data storage device;
   a rights object containing information indicative of access rights to audio/visual data and
   a verification identification;
   a memory in which the device identification and the rights object are stored, the memory partitioned into a plurality of areas of memory including:
      a first area as a protection area that stores an instruction code,
      a second area as a partition table area that stores a partition table,
      a third area as a file area that stores data files, and
      a fourth area as a controller area that stores controller logic, the controller logic configured to compare the verification identification with the device identification in response to a request from a client external to the portable data storage device to allow the client to access of the data files if the verification identification matches the device identification through interaction with an application program on said external client;
   wherein the device identification is stored in one of the first, second, third and fourth areas;
   wherein the client is an application programming interface (API) on a data retrieval device that is configured to retrieve the data files stored in the memory;
   wherein the verification identification is encrypted, and wherein the controller logic decrypts the verification identification before comparing the verification identification with the device identification;
   wherein the verification identification includes at least a portion of a particular sub-file name that is formed from one or more variables stored in the protection area;
   wherein the controller logic encrypts data transferred to the client from the memory and decrypts data received from the client;
   wherein data transfer between the controller logic and the client is encrypted using public key infrastructure (PKI); and
   wherein the device identification is generated from a combination of two or more of one-time programming, a random number generated by a random number generator, and a serial number of the memory.

* * * * *